United States Patent
Kobayashi et al.

(10) Patent No.: US 6,718,754 B2
(45) Date of Patent: Apr. 13, 2004

(54) OXYGEN STORAGE CONTROL OF ENGINE EXHAUST GAS PURIFICATION CATALYST

(75) Inventors: Hideaki Kobayashi, Yokohama (JP); Shigeaki Kakizaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/200,947

(22) Filed: Jul. 24, 2002

(65) Prior Publication Data

US 2003/0051463 A1 Mar. 20, 2003

(30) Foreign Application Priority Data

Aug. 1, 2001 (JP) .................................. 2001-233496

(51) Int. Cl.[7] .............................................. F01N 3/00
(52) U.S. Cl. .............................. 60/277; 60/276; 60/285
(58) Field of Search ........................ 60/276, 277, 285, 60/299

(56) References Cited

U.S. PATENT DOCUMENTS

| | | | | |
|---|---|---|---|---|
| 5,335,538 A | * | 8/1994 | Blischke et al. ........... | 73/118.1 |
| 5,609,023 A | * | 3/1997 | Katoh et al. .................. | 60/276 |
| 5,661,972 A | * | 9/1997 | Katoh et al. .................. | 60/276 |
| 5,678,402 A | * | 10/1997 | Kitagawa et al. ............. | 60/276 |
| 5,842,339 A | * | 12/1998 | Bush et al. .................... | 60/274 |
| 5,842,340 A | * | 12/1998 | Bush et al. .................... | 60/274 |
| 5,901,552 A | * | 5/1999 | Schnaibel et al. ............ | 60/274 |
| 6,289,673 B1 | * | 9/2001 | Tayama et al. ............... | 60/285 |
| 6,637,194 B2 | * | 10/2003 | Kakuyama et al. .......... | 60/285 |

FOREIGN PATENT DOCUMENTS

JP 10-184424 7/1998

* cited by examiner

*Primary Examiner*—Thomas Denion
*Assistant Examiner*—Diem Tran
(74) *Attorney, Agent, or Firm*—Foley & Lardner (57) ABSTRACT

A three-way catalyst (10) is provided in the exhaust passage (9) of an engine (1) which stores and releases oxygen according to the oxygen concentration in the exhaust gas. A controller (2) calculates an oxygen storage amount of the catalyst (10) by accumulating a variation rate of the oxygen storage amount of the catalyst (10) based on the oxygen amount in the exhaust gas (S3–S5). A target oxygen amount in the exhaust gas is calculated which reduces the difference of the oxygen storage amount from a target oxygen storage amount (S6). A target air/fuel ratio is calculated based on a catalyst deterioration coefficient, an exhaust gas flowrate and the target oxygen amount (S7). Due to this process, it is possible to increase the speed and accuracy of control of the oxygen storage amount of the catalyst (10) towards the target oxygen storage amount.

12 Claims, 5 Drawing Sheets

OXYGEN STORAGE CONTROL OF ENGINE EXHAUST GAS PURIFICATION CATALYST

FIELD OF THE INVENTION

This invention relates to control of an oxygen storage amount of an exhaust gas purification catalyst in an internal combustion engine.

BACKGROUND OF THE INVENTION

Tokkai Hei 10-184424 published by the Japanese Patent Office in 1998 discloses control of the storage amount of oxygen stored in a three-way catalyst in an exhaust passage of an internal combustion engine. This prior art technique calculates a release amount of stored oxygen in the three-way catalyst based on an air/fuel ratio detected by an air/fuel ratio sensor installed upstream of the catalyst in the exhaust passage, an intake air amount of the engine, and a speed ratio of oxygen storage and release of the catalyst. The accuracy of calculating the oxygen storage amount in the three-way catalyst is improved by correcting the speed ratio so that the calculated release amount coincides with the actual release amount.

SUMMARY OF THE INVENTION

The prior art technique controls the oxygen amount in the exhaust gas based on the output of the air/fuel ratio sensor in order to maintain the oxygen storage amount of the three-way catalyst to a target range. Specifically, the oxygen amount in the exhaust gas is modified based on the deviation of the oxygen storage amount in the catalyst from the target range. However when the three-way catalyst deteriorates, the oxygen storage capacity is reduced. As a result, if the oxygen storage amount of the three-way catalyst which has not undergone deterioration is controlled on the basis of a gain for the convergence of an oxygen storage amount in a deteriorated catalyst to the target range, long time is required for the convergence of the oxygen storage amount to the target range.

Furthermore the prior art technique sets a target air/fuel ratio of the air/fuel mixture supplied to the engine based on the calculated oxygen storage amount of the three-way catalyst, and controls the oxygen amount per unit time supplied to the engine based on the target air/fuel ratio. In this case, the oxygen amount supplied to the engine varies in response to the intake air amount even when the air/fuel ratio is held constant. Consequently, the oxygen amount per unit time supplied to the engine can not be controlled by only controlling the air/fuel ratio to the target air/fuel ratio.

The prior art technique makes the assumption in the calculation process for the oxygen storage amount of the three-way catalyst that the storage and release of oxygen is performed in a fixed ratio in the three-way catalyst. It is actually the case however that both the release speed and the storage speed of oxygen decrease after the catalyst has stored a certain amount of oxygen. Thus when the release speed and the storage speed of oxygen are respectively fixed, errors tend to result in the calculation of the oxygen storage amount.

It is therefore an object of this invention to increase the speed with which an oxygen storage amount converges to a target range set for a catalyst performing release and storage of oxygen.

It is a further object of this invention to increase the control accuracy on the oxygen amount supplied to the engine.

It is yet a further object of this invention to increase the calculation accuracy for the oxygen storage amount in the catalyst.

In order to achieve the above objects, this invention provides an air/fuel ratio control device for such an engine that is provided with an exhaust gas purification catalyst storing and releasing oxygen in response to the oxygen concentration of exhaust gas of the engine. The device comprises a fuel injector which injects fuel in the engine to generate an air/fuel mixture, a sensor which detects an air/fuel ratio of the air/fuel mixture, a sensor which detects a flowrate of the exhaust gas, and a programmable controller.

The controller is programmed to calculate an oxygen concentration of the exhaust gas based on the air/fuel ratio, calculate an oxygen amount in the exhaust gas based on the oxygen concentration and the flowrate of the exhaust gas, calculate a variation rate of an oxygen storage amount of the catalyst based on the oxygen amount in the exhaust gas, calculate the oxygen storage amount of the catalyst by accumulating the variation rate, calculate a target oxygen amount in the exhaust gas which reduces the difference between the oxygen storage amount and the predetermined target oxygen storage amount, calculate a target air/fuel ratio based on the target oxygen amount and the flowrate of the exhaust gas, and control a fuel injection amount of the fuel injector to a fuel injection amount corresponding to the target air/fuel ratio.

This invention also provides an air/fuel ratio control method for such an engine that is provided with an exhaust gas purification catalyst storing and releasing oxygen in response to the oxygen concentration of exhaust gas of the engine and a fuel injector which injects fuel in the engine to generate an air/fuel mixture.

The method comprises detecting an air/fuel ratio of the air/fuel mixture, detecting a flowrate of the exhaust gas, calculating an oxygen concentration of the exhaust gas based on the air/fuel ratio, calculating an oxygen amount in the exhaust gas based on the oxygen concentration and the flowrate of the exhaust gas, calculating a variation rate of an oxygen storage amount of the catalyst based on the oxygen amount in the exhaust gas, calculating the oxygen storage amount of the catalyst by accumulating the variation rate, calculating a target oxygen amount in the exhaust gas which reduces the difference between the oxygen storage amount and the predetermined target oxygen storage amount, calculating a target air/fuel ratio based on the target oxygen amount and the flowrate of the exhaust gas, and controlling a fuel injection amount of the fuel injector to a fuel injection amount corresponding to the target air/fuel ratio.

The details as well as other features and advantages of this invention are set forth in the remainder of the specification and are shown in the accompanying drawings.

DESCRIPTION OF THE PREFERRED EMBODIMENTS

Figure 1:
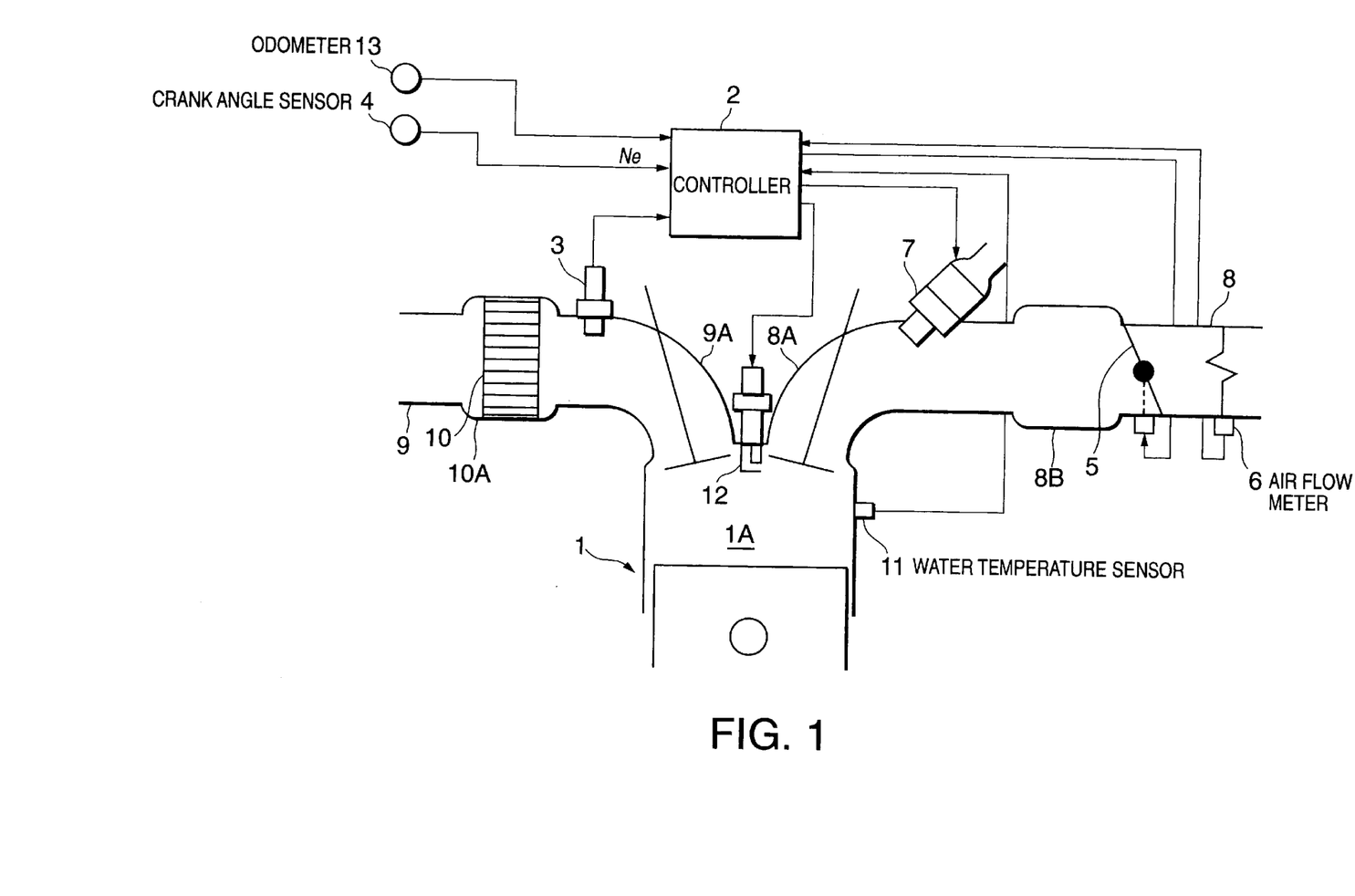
FIG. 1 is a schematic diagram of an engine to which this invention is applied.

Referring to FIG. 1 of the drawings, a multi-cylinder gasoline engine for a vehicle is provided with an intake passage 8 and an exhaust passage 9.

A throttle 5 is provided in the intake passage 8. The intake passage 8 branches downstream of the throttle 5 into respective cylinders via a collector 8B and an intake manifold 8A. A fuel injector 7 is provided in the intake manifold 8A.

Gasoline fuel injected by the fuel injector 7 is mixed with air aspirated through the intake passage 8 to generate an air/fuel mixture in a combustion chamber 1A in respective cylinders. A spark plug 12 facing the combustion chamber 1A ignites the air/fuel mixture and the air/fuel mixture burns in the combustion chamber 1A.

Combustion gas is discharged as exhaust gas to the exhaust passage 9 via a exhaust manifold 9A. A catalytic converter 10A housing a three-way catalyst 10 is provided in the midway along the exhaust gas passage 9. The three-way catalyst 10 is a known catalyst which has the function of reducing nitrogen oxides (NOx) in the exhaust gas, and oxidizing carbon monoxide (CO) and hydrocarbons (HC) in the exhaust gas. In this catalyst, an oxygen storage material such as cerium oxide, barium or a base metal is combined with a precious metal such as platinum or rhodium.

The catalyst 10 displays maximum conversion efficiency for oxidizing HC and CO and reducing NOx when the air/fuel ratio of the air/fuel mixture in the combustion chamber 1A is equal to a stoichiometric air/fuel ratio.

The oxygen storage material and the precious metal of the three-way catalyst 10 respectively have the function of storing oxygen. This oxygen storage function is used in order to supplement an excess/deficiency of oxygen in exhaust gas resulting from temporary deviation of the air/fuel ratio of the air/fuel mixture from the stoichiometric air/fuel ratio. The oxygen storage amount of the three-way catalyst 10 must be constantly maintained at a preferred level in order to ensure sufficient oxygen regulation functions.

A controller 2 controls the oxygen storage amount of the three-way catalyst 10 to a predetermined target oxygen storage amount by air/fuel ratio control on the air/fuel mixture. The air/fuel ratio control of the air/fuel mixture is enabled by increasing or decreasing the fuel injection amount of the fuel injector 7.

In order to perform this control, the air/fuel ratio control device according to this invention is provided with an air flow meter 6 which detects an intake air flowrate Qa in the intake air passage 8, a water temperature sensor 11 which detects a cooling water temperature Tw in the engine 1, a crank angle sensor 4 which detects a rotation speed Ne of the engine 1, a universal exhaust gas oxygen sensor 3 which is provided upstream of the catalytic converter 10A to detect an excess/deficiency oxygen concentration of exhaust gas, and an odometer 13 which detects an accumulated running distance of the vehicle. The detected data are input into the controller 2 in the form of signals. The odometer 13 functions as a sensor which generates a signal indicative of a level of deterioration in the catalyst.

The controller 2 calculates an exhaust gas flowrate Q from the intake air flowrate Qc. Instead of using the air flow meter 6, it is also possible to provide a flow meter in the exhaust gas passage 9 upstream of the catalytic converter 10A in order to detect the exhaust gas flowrate Q.

The universal exhaust gas oxygen sensor 3 is a known sensor which detects the excess/deficiency oxygen concentration of exhaust gas with reference to the composition of the exhaust gas resulting from the combustion of the air/fuel mixture at the stoichiometric air/fuel ratio. Herein, the excess/deficiency oxygen concentration of exhaust gas is a synonym for the air/fuel ratio of the air/fuel mixture that has generated the exhaust gas.

The controller 2 comprises a microcomputer which is provided with a central processing unit (CPU), a read only memory (ROM), a random access memory (RAM) and an input/output interface (I/O interface). The controller may also comprise a plurality of such microcomputers.

The controller 2 calculates the oxygen storage amount of the three-way catalyst 10 based on signals from the sensors above and calculates the target oxygen amount in the exhaust gas based on the oxygen storage amount. The fuel injection amount of the fuel injector 7 is then increased or decreased so that the target oxygen amount is realized.

The control process performed by the controller 2 will be now be described in more detail.

An oxygen storage/release model of the three-way catalyst 10 is organized based on a Freundlich Equation expressing physical adsorption in order to calculate the oxygen storage amount of the three-way catalyst 10. The Freundlich Equation is shown by Equation (1).

$$\text{Adsorption Amount} = a \cdot (\text{partial pressure})^{1/c}$$

where, $a$, $c$ = constants.

The partial pressure is defined in Equations (2) and (3).

When oxygen is stored in the three-way catalyst 10, $$\text{partial pressure} = \frac{\text{oxygen amount}}{\text{oxygen storage amount of catalyst}} \quad (2)$$

When oxygen is released from the three-way catalyst 10, $$\text{partial pressure} = -\frac{\text{oxygen amount}}{\text{maximum oxygen storage amount} - \text{oxygen storage amount}} \quad (3)$$

In Equations (2) and (3), the oxygen amount expresses the oxygen amount contained in exhaust gas. The oxygen storage amount expresses the oxygen storage amount in the three-way catalyst 10. The maximum oxygen storage amount expresses the maximum value of the oxygen amount which can be stored by the three-way catalyst 10.

Equations (4) to (8) are the equations for calculating the oxygen storage amount $HOSC_n$ of the three-way catalyst 10 using Equations (1) to (3). This calculation is repeated at a predetermined time interval.

The equations for calculating the oxygen storage amount $HOSC_n$ when the three-way catalyst 10 stores oxygen are shown below.

$$HOSC_n = HOSC_{n-1} + a \cdot \left(\frac{|FO_2 g|}{HOSC_{n-1}}\right)^{\frac{1}{c}} \quad (4)$$

$$\text{where, } a \cdot \left(\frac{|FO_2 g|}{HOSC_{n-1}}\right)^{\frac{1}{c}} \leq |FO_2 g| \quad (5)$$

$HOSC_{n-1}$=oxygen storage amount of three-way catalyst 10 calculated on immediately previous occasion, $FO_2 g$=oxygen amount in exhaust gas, and a, c=constants.

Equation (5) shows the fact that the oxygen storage amount of the three-way catalyst 10 in the period from the previous calculation to the current calculation does not exceed the oxygen inflow amount of the catalytic converter 10A in the same period.

The oxygen amount $FO_2 g$ in the exhaust gas is calculated from Equation (6).

$$FO_2 g = Q \cdot FO_2 \cdot t \quad (6)$$

where, Q=exhaust gas flowrate, $FO_2$ = excess / deficiency oxygen concentration $= \dfrac{\text{real air / fuel ratio} - \text{stoichiometric air / fuel ratio}}{\text{stoichiometric air / fuel ratio}}$, and $t$ = calculation interval.

The stoichiometric air/fuel ratio is taken to be 14.7. The excess/deficiency oxygen concentration $FO_2$ has a value of zero at the stoichiometric air/fuel ratio. When the air/fuel mixture in the combustion chamber 1A has a lean air/fuel ratio, the excess/deficiency oxygen concentration $FO_2$ has a positive value and when the air/fuel mixture in the combustion chamber 1A has a rich air/fuel ratio, it has a negative value. The excess/deficiency oxygen concentration $FO_2$ is calculated from the air/fuel ratio detected by the universal exhaust gas oxygen sensor 3.

The equations for calculating the oxygen storage amount $HOSC_n$ when the three-way catalyst 10 releases oxygen are shown below.

$$HOSC_n = HOSC_{n-1} - b \cdot \left(\frac{|FO_2 g|}{HOSC_y - HOSC_{n-1}}\right)^{\frac{1}{m}} \quad (7)$$

$$\text{where, } b \cdot \left(\frac{|FO_2 g|}{HOSC_y - HOSC_{n-1}}\right)^{\frac{1}{m}} \leq FO_2 g \quad (8)$$

$HOSC_y$=maximum oxygen storage amount of three-way catalyst 10, and b, m=constants.

Equation (8) shows the fact that the amount of oxygen released from the three-way catalyst 10 in the period from the previous calculation to the current calculation does not exceed the oxygen deficiency amount in exhaust gas in the same period.

Figure 2:
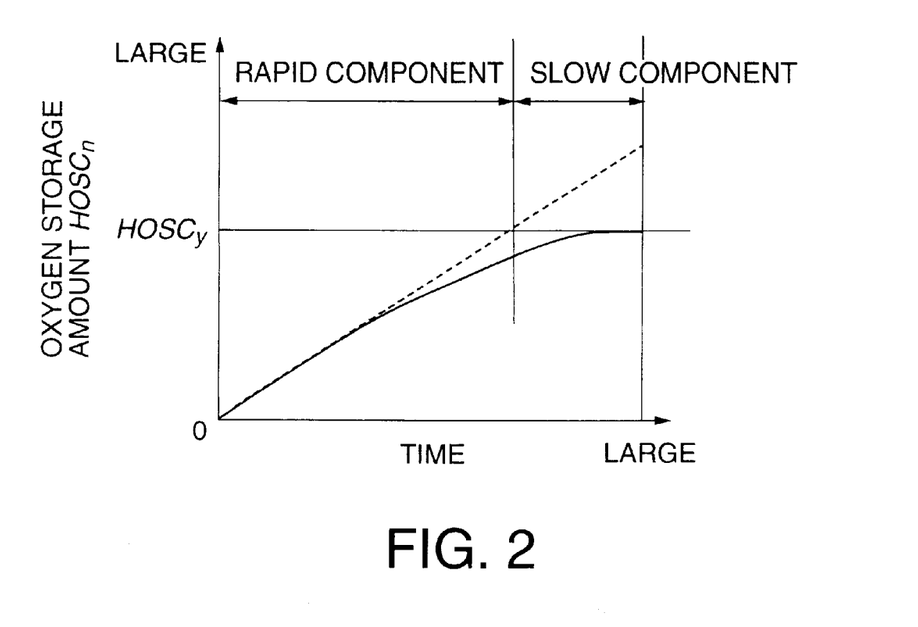
FIG. 2 is a diagram showing a variation of the oxygen storage amount of a three-way catalyst when increasing, calculated by a controller according to this invention.

Referring now to FIG. 2, when the three-way catalyst 10 stores oxygen, the oxygen storage amount $HOSC_n$ of the three-way catalyst 10 according to Equation (4) moves along the solid-line curve shown in the figure and reaches the maximum oxygen storage amount HOSCy. The broken line in the figure shows variation in the storage amount when the storage speed is taken to be fixed. When the storage speed is taken to be fixed, a considerable deviation results in the timing of a saturation determination for the oxygen storage amount as shown in the figure.

Figure 3:
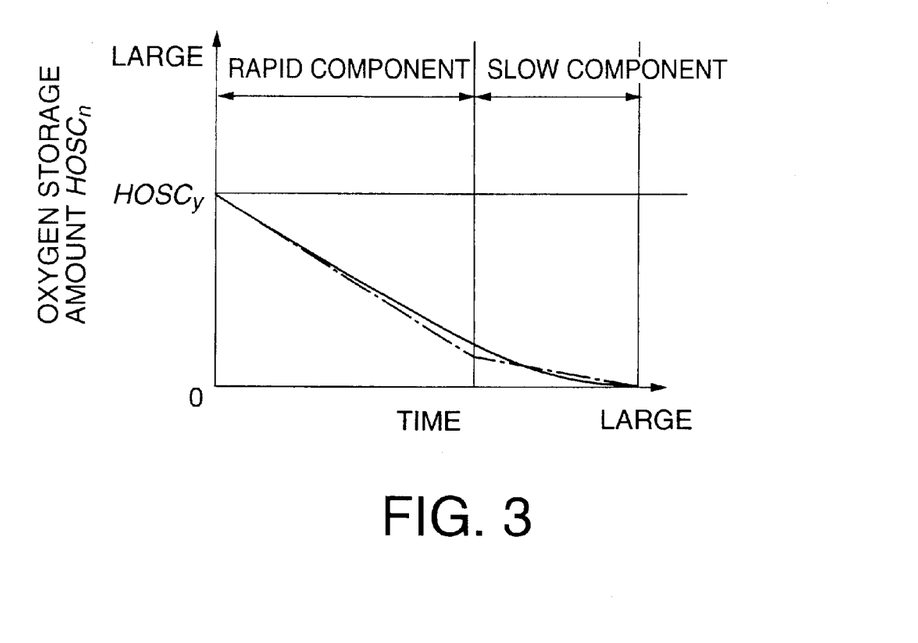
FIG. 3 is similar to FIG. 2, but showing a variation during decrease of oxygen storage amount of the three-way catalyst.

Referring now to FIG. 3, when the three-way catalyst 10 releases oxygen, the oxygen storage amount $HOSC_n$ of the three-way catalyst 10 according to Equation (7) moves along the solid-line curve shown in the figure and reaches a zero storage amount. The storage/release function for oxygen in the three-way catalyst 10 depends on the function performed by precious metals which display a high adsorption speed and the oxygen storage material which displays a low adsorption speed as described above. When the three-way catalyst 10 releases stored oxygen, both the precious metals and the oxygen storage material initially release oxygen.

However the precious metals rapidly complete oxygen release and thereafter only the oxygen storage material continues oxygen release. The dotted line in the figure shows the differences in the release speed based on the above characteristics. The calculation performed in Equation (7) gives a result which displays a high degree of correspondence to the oxygen storage/release characteristics in the three-way catalyst 10 as described above.

The calculation of the target oxygen amount $FO_2 t$ in the exhaust gas will now be described.

The target oxygen amount $FO_2 t$ is expressed by Equation (9).

$$FO_2 t = f(HOSC_y) \cdot \left( Gp \cdot HOSCS_n + Gi \cdot \frac{\sum HOSCS_n}{T} + Gd \cdot \frac{HOSCS_n - HOSCS_{n-1}}{t} \right) \quad (9)$$

where, $HOSCS_n = HOSC_n - tHOSC$, $HOSC_{n-1} = HOSC_{n-1} - tHOSC$, tHOSC=target oxygen storage amount, T=integration interval=elapsed time from inversion of positive or negative value for oxygen storage amount of three-way catalyst 10, t=calculation interval, and Gp, Gi, Gd=constants.

f(HOSCy) in Equation (9) is a deterioration coefficient showing the deterioration state of the three-way catalyst 10 and is defined by Equation (10).

$$f(HOSC_y) = -e \cdot HOSC_y + f \quad (10)$$

where, e, f=constants.

Figure 6:
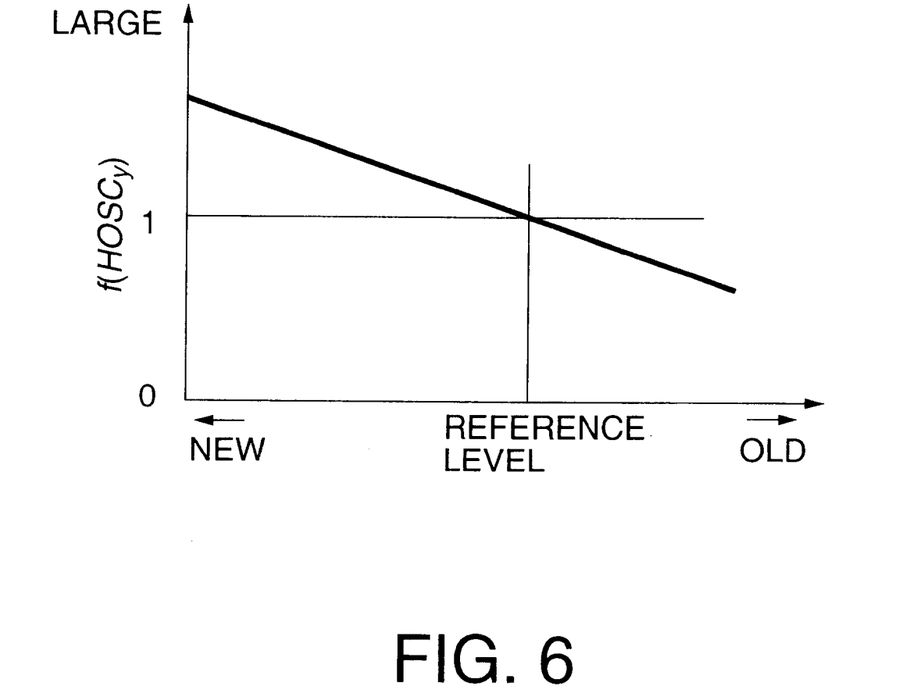
FIG. 6 is a diagram showing a characteristic of a map stored by the controller specifying a deterioration coefficient f(HOSCy) with respect to a maximum oxygen storage amount HOSCy of the three-way catalyst.

The relationship of the deterioration coefficient f(HOSCy) and the maximum oxygen storage amount HOSCy in Equation (10) is shown in FIG. 6.

The target oxygen storage amount tHOSC is set equal to one half of the maximum oxygen storage amount HOSCy.

The maximum oxygen storage amount HOSCy is determined by the method disclosed in U.S. patent application Ser. No. 09/958,842, the disclosure of which is herein incorporated by reference.

The target air/fuel ratio of the air/fuel mixture supplied to the combustion chamber 1A is calculated in Equation (11) based on target oxygen amount $FO_2t$ in the exhaust gas calculated in Equation (9).

$$\text{target air/fuel ratio} = \text{stoichiometric air/fuel ratio} \cdot \frac{FO_2t}{Q} + \text{stoichiometric air/fuel ratio} \quad (11)$$

where, Q=exhaust gas flowrate, and
stoichiometric air/fuel ratio=14.7.

The exhaust gas flowrate Q is set equal to the intake air flowrate Qa detected by the air flow meter 6.

The above target air/fuel ratio is not calculated not based only on the oxygen concentration but also on the target oxygen amount $FO_2t$. By controlling the fuel injection amount of the fuel injector 3 according to the above calculated target air/fuel ratio, therefore, the effect of fluctuation in the oxygen amount under a constant oxygen concentration is eliminated, and the oxygen storage amount of the three-way catalyst 10 is precisely calculated.

The level of deterioration of the three-way catalyst 10 is taken into account when calculating the target oxygen amount $FO_2t$. Thus it is possible to vary the speed of convergence of the oxygen storage amount in the three-way catalyst 10 to a predetermined convergence target range according to the level of catalyst deterioration.

Figure 4:
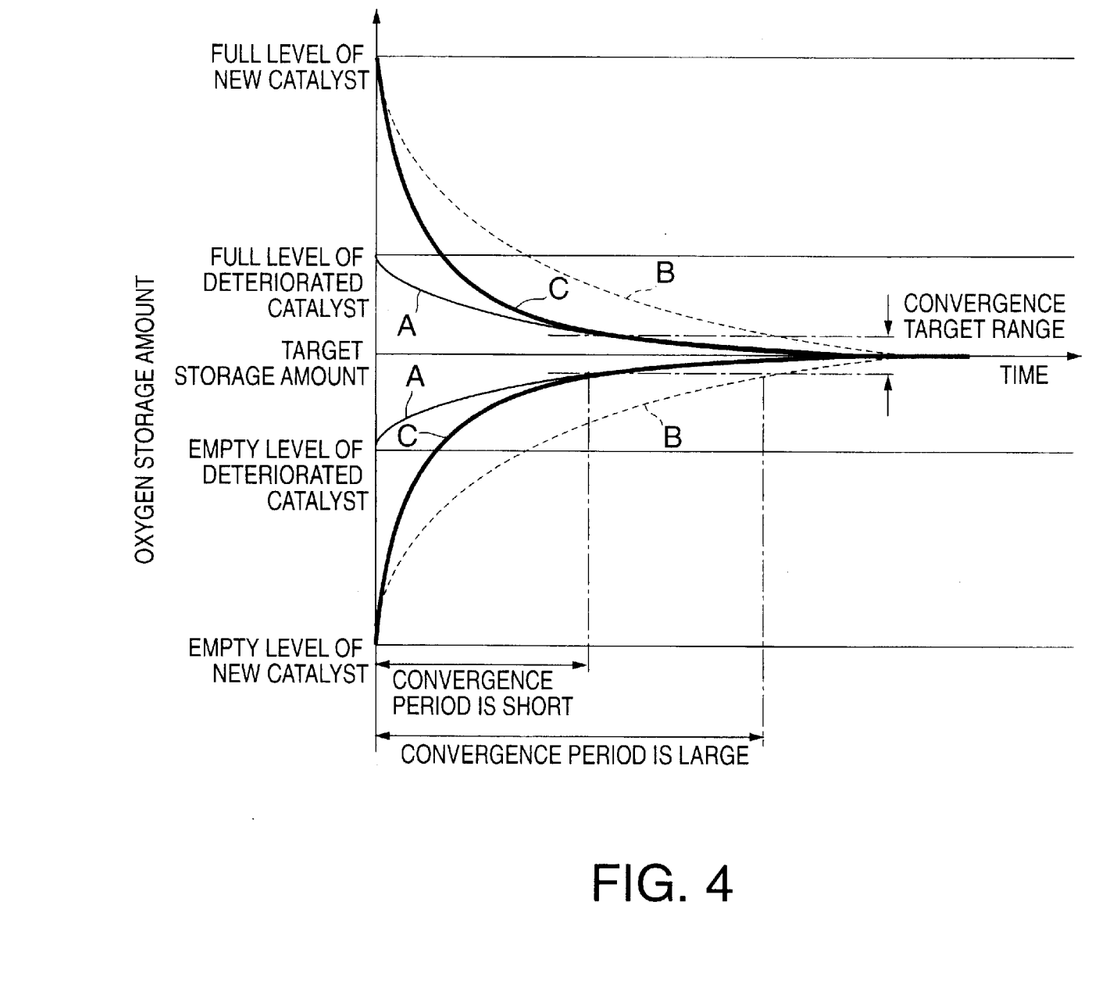
FIG. 4 is a diagram showing control of the oxygen storage amount of the three-way catalyst according to this invention.

Curve A in FIG. 4 shows the variation in the oxygen storage amount during convergence to a convergence target range based on a gain in the oxygen storage amount of a three-way catalyst which has undergone deterioration. Curve B shows the variation in the oxygen storage amount during convergence of the oxygen storage amount to the same convergence target range when using a three-way catalyst which has not undergone deterioration, and the same gain as that in Curve A. Curve A and Curve B show that there is a large difference with respect to the required time for the oxygen storage amount to converge to the same convergence range.

In contrast, control of the oxygen storage amount according to this invention sets the target oxygen amount $FO_2t$ in the exhaust gas according to the deterioration coefficient f(HOSCy) of the three-way catalyst 10. Consequently, the oxygen storage amount of the three-way catalyst as shown by the Curve C in the figure converges to the convergence target range in a short, approximately fixed time period irrespective of the level of catalyst deterioration.

When the oxygen storage amount rapidly approaches the convergence target range as shown by Curve C, undesirable variation in the oxygen storage amount can also be reduced. Such variation appears, for example, due to external disturbances, and the oxygen storage amount of the three-way catalyst 10 may become saturated or takes a value of zero apart from the oxygen storage amount $HOSC_n$ by calculation.

Since this invention performs the calculation of the oxygen storage amount of the three-way catalyst 10 using an oxygen storage/release model based on the Freundlich Equation, the calculation accuracy of the oxygen storage amount for the three-way catalyst 10 is improved.

Figure 5:
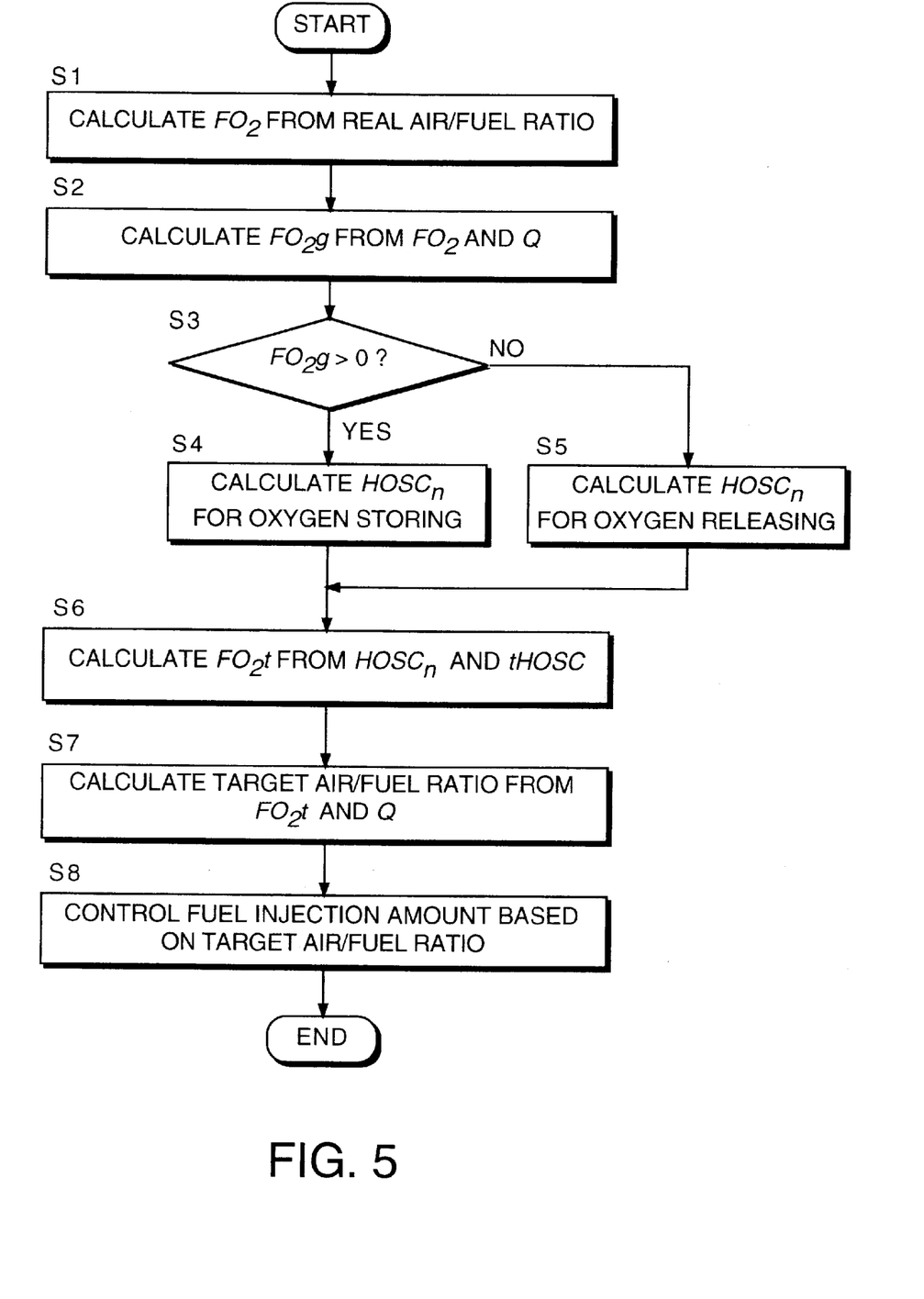
FIG. 5 is a flowchart describing an air/fuel ratio control routine executed by the controller according to this invention.

Finally referring to FIG. 5, the calculation routine for the target air/fuel ratio performed by the controller 2 using the above calculation process will be described. This routine is executed at an interval of ten milliseconds during operation of the engine 1. Thus the calculation interval t is ten milliseconds.

Firstly in a step S1, the controller 2 calculates the excess/deficiency oxygen concentration $FO_2$ in exhaust gas from the air-fuel ratio detected by the universal exhaust gas oxygen sensor 3.

In a next step S2, the controller 2 calculates the oxygen amount in exhaust gas $FO_2g$ from the excess/deficiency oxygen concentration $FO_2$ and the exhaust gas flowrate Q.

In a next step S3, the controller 2 determines whether or not the oxygen amount in exhaust gas $FO_2g$ calculated in the step S2 takes a positive value.

When $FO_2g$ is a positive value, it shows that the three-way catalyst 10 is storing oxygen in the exhaust gas. In this case, the controller 2 uses Equation (4) in a step S4 in order to calculate the oxygen storage amount $HOSC_n$ of the three-way catalyst 10.

On the other hand, when the value for $FO_2g$ is not a positive value, it shows that either the three-way catalyst 10 is releasing oxygen into the exhaust gas or that the three-way catalyst 10 is neither storing nor releasing oxygen. In this case, the controller 2 uses Equation (7) in a step S5 in order to calculate the oxygen storage amount $HOSC_n$ of the three-way catalyst 10.

$FO_2g$ takes a value of zero when the three-way catalyst 10 is neither storing nor releasing oxygen. Consequently, the value for the oxygen storage amount $HOSC_n$ will equal the previous value $HOSC_{n-1}$ when either Equation (4) or Equation (7) are used. Herein for the sake of convenience, when $FO_2g$ takes a value of zero, Equation (7) is used.

In the calculation performed in the step S4 or the step S5, the initial value for the oxygen storage amount $HOSC_n$ is set to equal the maximum oxygen storage amount HOSCy. That is to say, when the routine is performed for the first time after starting the engine 1, the oxygen storage amount of the three-way catalyst 10 is assumed to be in a state of saturation. This is due to the fact that the catalytic converter 10A is filled with air when the engine 1 is not operating.

After the oxygen storage amount $HOSC_n$ of the three-way catalyst 10 is calculated in the step S4 or the step S5, the controller 2 calculates the target oxygen amount $FO_2t$ in the exhaust gas in a step S6 using Equation (9).

In a next step S7, the target air/fuel ratio is calculated from Equation (11) based on the target oxygen amount $FO_2t$ in the exhaust gas.

In a final step S8, using the determined target air/fuel ratio and the intake air flowrate Qa detected by the air flow meter 6, the controller 2 determines the fuel injection amount of the fuel injector 7 and controls the fuel injector 7 so that a determined amount of fuel is injected.

After the process in the step S8, the routine is terminated.

The contents of Tokugan 2001-233496, with a filing date of Aug. 1, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. An air/fuel ratio control device for an engine, the engine provided with an exhaust gas purification catalyst storing and releasing oxygen in response to the oxygen concentration of exhaust gas of the engine, comprising:

a fuel injector which injects fuel in the engine to generate an air/fuel mixture;

a sensor which detects an air/fuel ratio of the air/fuel mixture;
a sensor which detects a flowrate of the exhaust gas; and
a programmable controller programmed to:
calculate an oxygen concentration of the exhaust gas based on the air/fuel ratio;
calculate an oxygen amount in the exhaust gas based on the oxygen concentration and the flowrate of the exhaust gas;
repeatedly calculate a variation rate of an oxygen storage amount of the catalyst based on the oxygen amount in the exhaust gas and an oxygen storage amount of the catalyst on an immediately preceding occasion when the calculation of the variation rate was performed;
calculate the oxygen storage amount of the catalyst by accumulating the variation rate;
calculate a target oxygen amount in the exhaust gas which reduces the difference between the oxygen storage amount and the predetermined target oxygen storage amount;
calculate a target air/fuel ratio based on the target oxygen amount and the flowrate of the exhaust gas; and
control a fuel injection amount of the fuel injector to a fuel injection amount corresponding to the target air/fuel ratio.

2. The air/fuel ratio control device as defined in claim 1, wherein the device further comprises a sensor which detects a level of deterioration in the catalyst, and the controller is further programmed to correct the target oxygen amount in the exhaust gas according to the level of deterioration of the catalyst.

3. The air/fuel ratio control device as defined in claim 1, wherein the controller is further programmed to calculate the oxygen amount in the exhaust gas as an excess/deficiency amount with respect to the oxygen amount in the exhaust gas resulting from combustion of the air/fuel mixture at a stoichiometric air/fuel ratio, and calculate the variation rate based on the excess/deficiency amount.

4. The air/fuel ratio control device as defined in claim 3, wherein the controller is further programmed to repeat the calculation of the oxygen amount in the exhaust gas at a time interval t by the following Equation (A)

$$FO_2g = Q \cdot FO_2 \cdot t \quad (A)$$

where, Q=flowrate of the exhaust gas, and $$FO_2 = \text{excess/deficiency oxygen concentration}$$
$$= \frac{\text{real air/fuel ratio} - \text{stoichiometric air/fuel ratio}}{\text{stoichiometric air/fuel ratio}}$$

5. The air/fuel ratio control device as defined in claim 3, wherein the controller is further programmed to calculate the variation rate of the oxygen storage amount of the catalyst as a positive value when the oxygen amount in the exhaust gas is a positive value; and calculate the variation rate of the oxygen storage amount of the catalyst as a negative value when the oxygen amount in the exhaust gas is a negative value.

6. The air/fuel ratio control device as defined in claim 5, wherein the controller is further programmed to repeat the calculation of the oxygen amount in the exhaust gas at a time interval t using the following Equation (B) when the oxygen amount in the exhaust gas is a positive value:

$$HOSC_n = HOSC_{n-1} + a \cdot \left(\frac{|FO_2g|}{HOSC_{n-1}}\right)^{\frac{1}{c}} \quad (B)$$

where, $$a \cdot \left(\frac{|FO_2g|}{HOSC_{n-1}}\right)^{\frac{1}{c}} = \text{variation rate of the oxygen storage amount of the catalyst} \leq |FO_2g|,$$

$HOSC_n$=oxygen storage amount of the catalyst,
$HOSC_{n-1}$=oxygen storage amount of the catalyst calculated on the immediately preceding occasion when the calculation was performed,
$FO_2g$=oxygen amount in the exhaust gas, and
a, c=constants.

7. The air/fuel ratio control device as defined in claim 5, wherein the controller is further programmed to repeat the calculation of the oxygen amount in the exhaust gas at a time interval t using the following Equation (C) when the oxygen amount in the exhaust gas is a negative value:

$$HOSC_n = HOSC_{n-1} - b \cdot \left(\frac{|FO_2g|}{HOSC_y - HOSC_{n-1}}\right)^{\frac{1}{m}} \quad (C)$$

where, $$-b \cdot \left(\frac{|FO_2g|}{HOSC_y - HOSC_{n-1}}\right)^{\frac{1}{m}} = \text{variation rate of the oxygen storage amount of the catalyst,}$$

$$b \cdot \left(\frac{|FO_2g|}{HOSC_y - HOSC_{n-1}}\right)^{\frac{1}{m}} \leq FO_2g,$$

$HOSC_n$=oxygen storage amount of the catalyst,
$HOSC_{n-1}$=oxygen storage amount of the catalyst calculated on the immediately preceding occasion when the calculation was performed,
$FO_2g$=oxygen amount in the exhaust gas,=variation rate of the oxygen storage amount of the catalyst,
HOSCy=maximum oxygen storage amount of the catalyst, and
b, m=constants.

8. The air/fuel ratio control device as defined in claim 7, wherein the engine is an engine which drives a vehicle and the device further comprises a sensor which detects an accumulated distance traveled by the vehicle, and the maximum oxygen storage amount HOSCy of the catalyst is set according to the accumulated distance traveled by the vehicle.

9. The air/fuel ratio control device as defined in claim 1, wherein the controller is further programmed to repeat the calculation of the target oxygen amount in the exhaust gas at a time interval t using the following Equation (D):

$$FO_2t = f(HOSC_y) \cdot \quad (D)$$

$$\left(Gp \cdot HOSCS_n + Gi \cdot \frac{\sum HOSCS_n}{T} + Gd \cdot \frac{HOSCS_n - HOSCS_{n-1}}{t}\right)$$

where, $FO_2t$=target oxygen amount in the exhaust gas,
$f(HOSCy)$=deterioration coefficient of the catalyst,
$HOSCS_n = HOSC_n - tHOSC$
$HOSCS_{n-1} = HOSC_{n-1} tHOSC$ tHOSC=target oxygen storage amount of the catalyst, $HOSC_n$=oxygen storage amount in the catalyst, $HOSC_{n-1}$=oxygen storage amount of the catalyst calculated on the immediately preceding occasion when the calculation was performed, T=elapsed time from inversion of a sign of the oxygen storage amount of the catalyst, and Gp, Gi, Gd=constants.

10. The air/fuel ratio control device as defined in claim 9, wherein the deterioration coefficient f(HOSCy) is set according to a maximum oxygen storage amount HOSCy of the catalyst.

11. An air/fuel ratio control device for an engine, the engine provided with an exhaust gas purification catalyst storing and releasing oxygen in response to the oxygen concentration of exhaust gas of the engine, comprising:

means for injecting fuel in the engine to generate an air/fuel mixture;

means for detecting an air/fuel ratio of the air/fuel mixture;

means for detecting a flowrate of the exhaust gas;

means for calculating an oxygen concentration of the exhaust gas based on the air/fuel ratio;

means for calculating an oxygen amount in the exhaust gas based on the oxygen concentration and the flowrate of the exhaust gas;

means for repeatedly calculating a variation rate of an oxygen storage amount of the catalyst based on the oxygen amount in the exhaust gas and an oxygen storage amount of the catalyst on an immediately preceding occasion when the calculation of the variation rate was performed;

means for calculating the oxygen storage amount of the catalyst by accumulating the variation rate;

means for calculating a target oxygen amount in the exhaust gas which reduces the difference between the oxygen storage amount and the predetermined target oxygen storage amount;

means for calculating a target air/fuel ratio based on the target oxygen amount and the flowrate of the exhaust gas; and means for controlling a fuel injection amount of the fuel injecting means to a fuel injection amount corresponding to the target air/fuel ratio.

12. An air/fuel ratio control method for an engine, the engine provided with an exhaust gas purification catalyst storing and releasing oxygen in response to the oxygen concentration of exhaust gas of the engine and a fuel injector which injects fuel in the engine to generate an air/fuel mixture; the method comprising:

detecting an air/fuel ratio of the air/fuel mixture;

detecting a flowrate of the exhaust gas;

calculating an oxygen concentration of the exhaust gas based on the air/fuel ratio; calculating an oxygen amount in the exhaust gas based on the oxygen concentration and the flowrate of the exhaust gas;

calculating repeatedly a variation rate of an oxygen storage amount of the catalyst based on the oxygen amount in the exhaust gas and an oxygen storage amount of the catalyst on an immediately preceding occasion when the calculation of the variation rate was performed;

calculating the oxygen storage amount of the catalyst by accumulating the variation rate;

calculating a target oxygen amount in the exhaust gas which reduces the difference between the oxygen storage amount and the predetermined target oxygen storage amount;

calculating a target air/fuel ratio based on the target oxygen amount and the flowrate of the exhaust gas; and controlling a fuel injection amount of the fuel injector to a fuel injection amount corresponding to the target air/fuel ratio.

* * * * *